(12) United States Patent
Jaeger

(10) Patent No.: US 7,506,245 B2
(45) Date of Patent: Mar. 17, 2009

(54) METHOD FOR PERFORMING A LOAD-ON-DEMAND OPERATION ON ASSIGNED GRAPHIC OBJECTS IN A COMPUTER OPERATING ENVIRONMENT

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 79 days.

(21) Appl. No.: 10/951,500

(22) Filed: Sep. 27, 2004

(65) Prior Publication Data

US 2006/0069984 A1    Mar. 30, 2006

(51) Int. Cl.
 *G06F 15/00* (2006.01)
(52) U.S. Cl. .................. 715/230; 715/231; 715/232; 715/233
(58) Field of Classification Search ............. 715/512
 See application file for complete search history.

(56) References Cited

U.S. PATENT DOCUMENTS

| | | | | | |
|---|---|---|---|---|---|
| 5,301,336 | A | * | 4/1994 | Kodosky et al. ............. | 715/846 |
| 5,655,136 | A | * | 8/1997 | Morgan ...................... | 382/187 |
| 5,778,372 | A | * | 7/1998 | Cordell et al. .............. | 707/100 |
| 5,880,740 | A | * | 3/1999 | Halliday et al. ............. | 345/629 |
| 6,525,749 | B1 | * | 2/2003 | Moran et al. ................ | 715/863 |
| 6,883,145 | B2 | * | 4/2005 | Jaeger ....................... | 715/767 |
| 2002/0109737 | A1 | * | 8/2002 | Jaeger ....................... | 345/863 |

OTHER PUBLICATIONS

Ernst, Warren, "Using Netscape," QUE Corporation, published Mar. 23, 1995, cover and copyright pages, and pp. 50-51.*

* cited by examiner

*Primary Examiner*—Doug Hutton
*Assistant Examiner*—Nathan Hillery

(57) ABSTRACT

A method for performing a load-on-demand operation on assigned graphic objects allows a user to load a computer file without the assigned graphic objects to shorten the loading time of the computer file. The assigned graphic objects can be subsequently loaded by the user by activating an "assigned to" object.

12 Claims, 10 Drawing Sheets

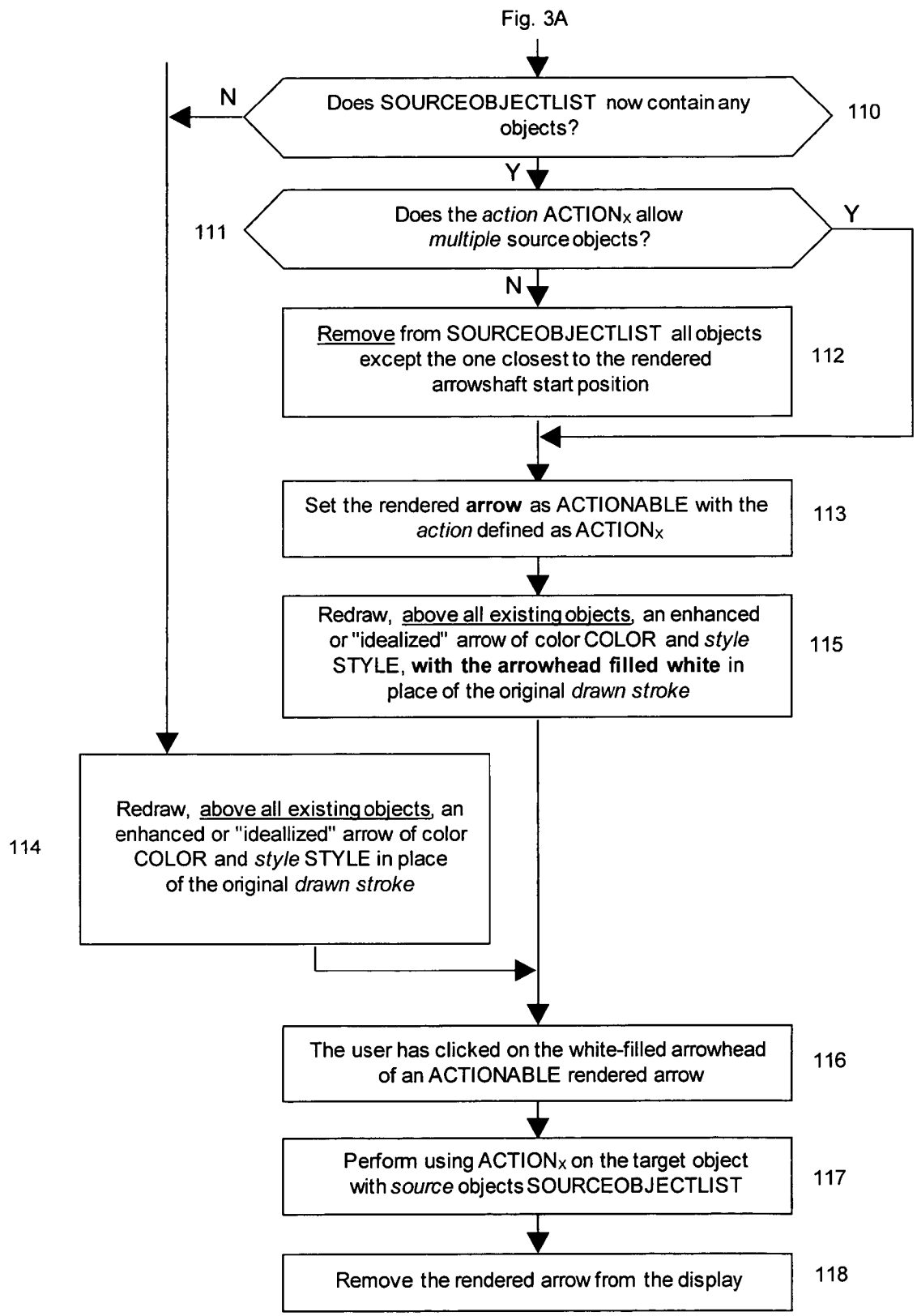

METHOD FOR PERFORMING A LOAD-ON-DEMAND OPERATION ON ASSIGNED GRAPHIC OBJECTS IN A COMPUTER OPERATING ENVIRONMENT

FIELD OF THE INVENTION

The invention relates generally to computer operations, and more particularly to a method for loading computer files.

BACKGROUND OF THE INVENTION

When a computer file is loaded into a computer program, the amount of time it takes to fully load the computer file not only depends on the speed of the computer on which the computer program is running but also the size of the computer file. As an example, if a computer file contains an electronic document that has only several lines of text, the loading time would be minimal. However, as an example, if a computer file contains an electronic document that has many lines of text with many high resolution graphics, the loading time may last several minutes. Such a long loading time can be frustrating if a user is loading and closing a number of large computer files.

Using conventional computer programs, the user is left with no option with respect to the loading time. Thus, the user has to wait until every object and element in a computer file is loaded regardless of whether the user wants a particular object or element to be loaded. As an example, even if the user does not want particular objects or elements in an electronic document to be load, these unwanted objects or elements must be loaded when the computer file containing the electronic document is loaded. Thus, conventional computer programs do not allow the user to selectively load objects and elements in a computer file.

In view of this concern, there is a need for a method of loading a computer file that allows the user to control the objects or elements that are loaded when the computer file is loaded into a computer program.

SUMMARY OF THE INVENTION

A method for performing a load-on-demand operation on assigned graphic objects allows a user to load a computer file without the assigned graphic objects to shorten the loading time of the computer file. The assigned graphic objects can be subsequently loaded by the user by activating an "assigned to" object.

A method for performing a load-on-demand operation in accordance with an embodiment of the invention comprises assigning at least one graphic object to a target graphic object, loading a computer file that includes the target graphic object without the assigned graphic object to produce a computer environment having the target graphic object, activating the target graphic object, and loading the assigned graphic object in the computer environment in response to the activation of the target graphic object.

An embodiment of the invention includes a storage medium, readable by a computer, tangibly embodying a program of instructions executable by the computer to perform method steps for performing a load-on-demand operation.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 3A and 3B show a flowchart of a process for drawing an arrow in Blackspace environment and applying an arrow logic in accordance with an embodiment of the invention.

DETAILED DESCRIPTION

A method for performing a load-on-demand operation on one or more assigned graphic objects in accordance with an embodiment of the invention allows a user to load a computer file without the assigned graphic objects, which can be subsequently loaded by the user as needed. Thus, the method allows computer files to be loaded more quickly when compared to loading the same computer files with all the assigned graphic objects.

In an exemplary embodiment, the method in accordance with the invention is executed by software installed and running in a computer. Thus, the method is sometimes referred to herein as the "software". The method is described herein with respect to a computer operating environment referred to as the "Blackspace" environment. However, the invention is not limited to the Blackspace environment and may be implemented in a different computer operating environment. The word "Blackspace" is a trademark of the NBOR Corporation. The Blackspace environment presents one universal drawing surface that is shared by all graphic objects within the environment. The Blackspace environment is analogous to a giant drawing "canvas" on which all graphic objects generated in the environment exist and can be applied. Thus, the Blackspace environment is sometimes referred to herein as the Blackspace surface. Each of these graphic objects can have a user-created relationship to any or all the other objects. There are no barriers between any of the objects that are created for or exist on this canvas. User can create objects with various functionalities without delineating sections of screen space.

In the Blackspace environment, one ore more graphic objects can be assigned to another graphic object using a particular arrow logic, referred to herein as "assignment" or "place inside" arrow logic, in accordance with an embodiment of the invention. This arrow logic will take all objects intersected, nearly intersected or encircled ("intersected") by a drawn and recognized arrow of a particular color, e.g., yellow, and place them in an "assignment" object. The assignment object, which now contains the intersected objects, is attached to the graphic object that the arrow points to. Since the objects "intersected" by the arrow are placed in the assignment object, these objects disappear from the screen when the arrow logic is implemented. However, when the assignment object is activated, e.g., by clicking on the graphic object to which the assignment has been made, the assigned objects (the objects that were placed in the assignment object) reappear on the screen.

Figure 1:
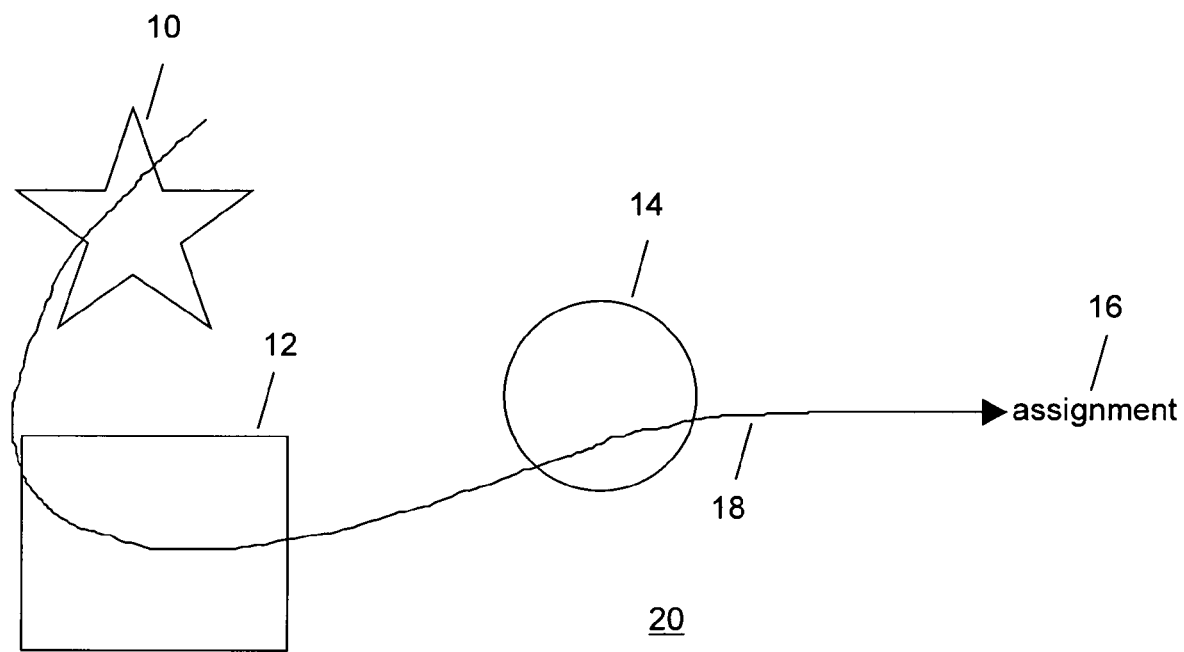
FIG. 1 depicts the assigning of graphic objects to a target graphic object in accordance with an embodiment of the invention.

As an example, in FIG. 1, a star 10, a rectangle 12, a circle 14 and a text object "assignment" 16 are displayed in a Blackspace environment 20. To assign the star 10, the rectangle 12 and the circle 14 to the text object 16, a yellow arrow 18 is drawn to intersect the star, the rectangle and the circle with the head of the arrow pointed to the text object 16. After drawing the arrow 18, if the software recognizes the drawing of the arrow, which has the "place in" arrow logic designated for it, and if this arrow (as drawn) has a valid source object and target object, the head of the yellow arrow will turn color (e.g., white) or have some other appropriate graphic applied to it to visibly change its state. Other possibilities for this graphic would be pulsing the arrowhead, or flashing it, or changing it to another color, etc. When the user clicks on the arrowhead, the "place in" arrow logic is implemented and the star 10, the rectangle 12 and the circle 14 are placed in the text object 16. Consequently, the star 10, the rectangle 12 and the circle 14 will disappear from the screen. These assigned objects, i.e., the star 10, the rectangle 12 and the circle 14, can then be made to reappear on the screen by clicking the assigned-to object, i.e., the text object 16.

NOTE: For more information pertaining to arrow and arrow logics please refer to pending U.S. patent application Ser. No. 09/880,397, filed Jun. 12, 2001, entitled "Arrow Logic System for Creating and Operating Control Systems", and pending U.S. patent application Ser. No. 10/940,507, filed Sept. 13, 2004, entitled "Method for Creating User-Defined Computer Operations Using Arrows", which are both incorporated herein by reference.

There are other ways in which assignments can be made in the Blackspace environment. One method is referred to herein as the "automatic assignment". When the user creates a new graphic object, the software looks to see if an assignment has been previously allocated to this type of object. If it has, then the existing assignment is automatically attached to the new object. Another method is referred to herein as the "automatic copy assignment". When an assignment object is copied, the corresponding assigned object(s) is also copied and assigned to the copied assignment object.

Load on Demand enables a "log" to be loaded very quickly, where this log contains one or more assignment objects. A log is a snapshot of the system state. A log saves complete definitions of every control in the system. It contains sufficient information to recreate all of these controls and the state of all the contexts in a Blackspace environment. The benefit here is twofold: (a) quicker load times, and (b) user selectable loading of graphic elements that are added to the current screen setup. Load on Demand is distinguished over Java script mini programs because it is not a mini program. Java scripts are used on web pages to enable a user to click on a piece of text or on a graphic object and then have a menu appear or a pop up window appear. When such a pop down menu appears, it is accomplished by executing a Java script—in other words—executing a program that is written to perform that specific function. These Java scripts (programs) are loaded with the web page. So when a user downloads a web page they also download any Java scripts that go with it. Then when a user clicks on any area of the screen that has a Java script programmed for it, this executes a little program that a designer of the web page has created.

Load on Demand is distinguished from hyper text and its equivalent in the following ways. When a user clicks on hyper text on a web page, it takes them to a new page. Also, this hyper text or its equivalent is programmed by a designer of the web page. The user of the web page is not involved in this process nor can they change this process according to their own desires and wishes. With Load on Demand, associated with the drawing of "place inside" ("assignment") arrows, the user has many functions that they control.

For instance, (a) they can decide what objects they assign, (b) they can decide what object they assign these objects to, (c) they can decide where all of these objects are onscreen, (d) they can determine the status and properties of each of these objects, e.g., their size, color, location, transparency, etc., (e) they can determine the behavior of these objects, e.g., what function(s) do each object perform, if any, and (f) they can determine which "assigned-to" objects are in the Load on Demand mode and which are not.

When a user clicks on hyper text or its equivalent, they switch from one place to another or use Java script to make a menu appear onscreen. With the software of this invention a user can click on any object, that is determined by the user, and have any number of objects and types of objects, with various user-determined functions, appear at any location(s) of the users choosing. In short, with the software of this invention users can program their own software without Java Scripts or hyper text or its equivalent.

These users do not need to know any programming language. The execution of assignments and Load on Demand is accomplished by simple to use graphical tools and by drawing onscreen.

Furthermore, users of the invention can access Load on Demand files at any time and use them for any "log" and modify them at any time. When a user clicks on any object that has had the Load on Demand function activated for it, this loads new information into the document. This information is fully under the control of the user and can be modified at any time by the user. No computer programmer is required for any of these operations.

When Load on Demand is utilized, the user is not taken to a new page. In the Blackspace environment, there is only one drawing surface and all actions, designs, drawing, typing, etc., occur on this single global drawing surface. So Load on Demand adds new information to this drawing surface and does not take the user to a new location. This new information can be active, interactive or purely visual in nature. In other words, this new information can be played back, like an animation or video or slide show. Additionally, it can be used to modify other information currently onscreen, like recalling picture controls that can be used to change the hue, contrast, saturation, brightness and the like of pictures that exist onscreen in a document. The new information can also be purely visual, like pictures, drawings, sketches, typed text, graphs and the like that are purely for the purpose of viewing onscreen.

Figure 2:
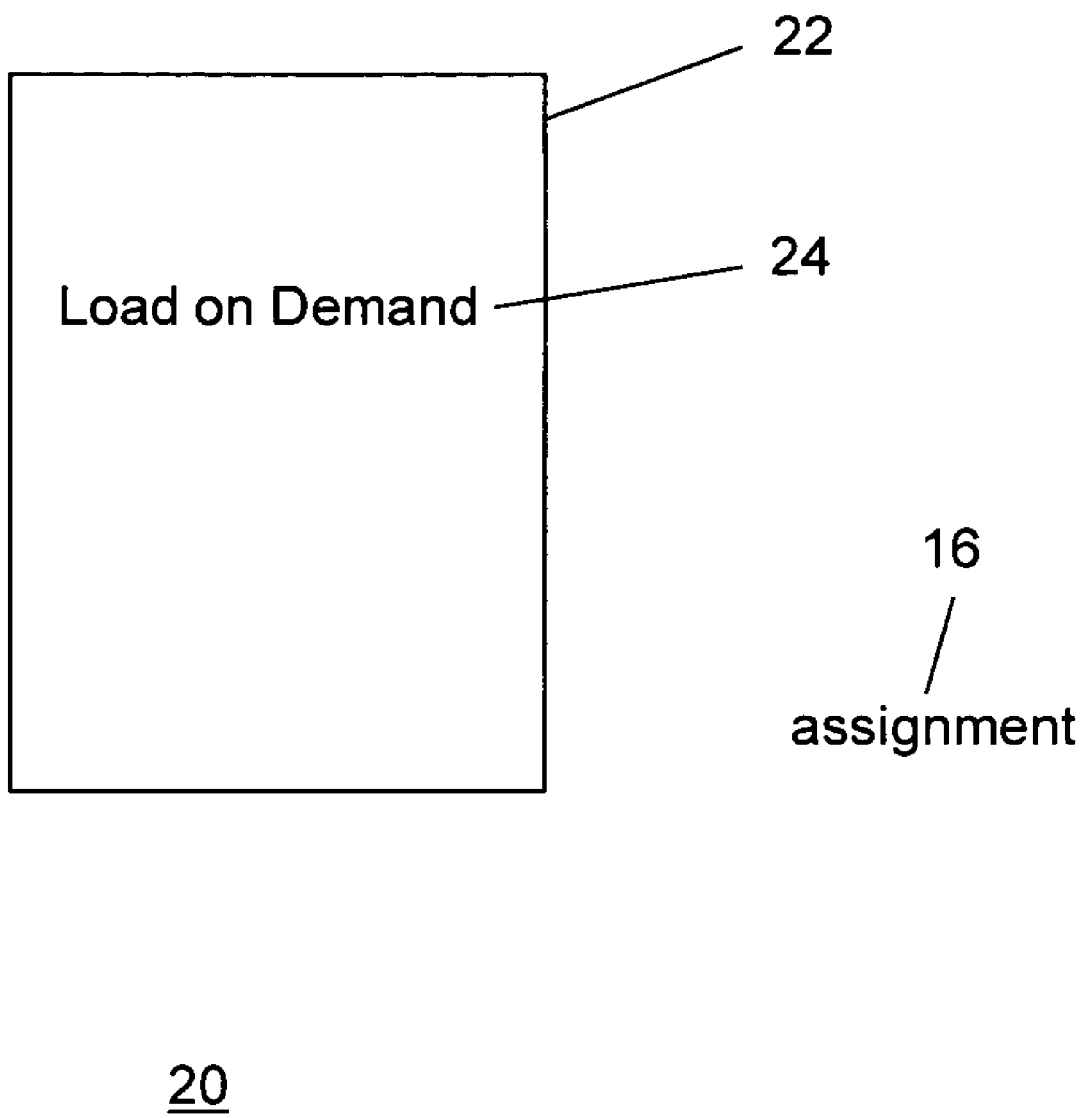
FIG. 2 depicts the activation of a load-on-demand function for an "assigned to" object in accordance with an embodiment of the invention.

Using the example of FIG. 1, the activating of the load-on-demand function is described with reference to FIG. 2. In FIG. 2, the text object 16 is displayed in the Blackspace environment 20. As described above with reference to FIG. 1, the text object 16 is an assignment object to which the star 10, the rectangle 12 and the circle 14 (not shown in FIG. 2) are assigned. In the Info Canvas object 22 for the text object 16, there is an entry called "Load on Demand" 24. An Info Canvas object includes various entries for modifying properties or behaviors of a graphic object to which it belongs. The word "Info Canvas" is a trademark of the NBOR Corporation. For more information on Info Canvas objects, see U.S. patent application Ser. No. 10/635,742, filed on Aug. 5, 2003, entitled "Intuitive Graphic User Interface with Universal Tools", U.S. patent application Ser. No. 10/671,953, filed on Sep. 26, 2003, entitled "Intuitive Graphic User Interface with Universal Tools", and PCT patent application No. PCT/US2004/025547, filed on Aug. 5, 2004, which are all incorporated herein by reference.

The Load on Demand entry 24 can be clicked to activate the load-on-demand function for the assignment object, 16. When the load-on-demand function is activated for an assignment object, the source objects of the assignment object are not loaded when the log of a Blackspace environment is loaded. In this example, when the log of the Blackspace environment 20 is loaded, the text object 16 will be loaded, but the star 10, the rectangle 12 and the circle 14, which are assigned to the text object, are not loaded. Instead, the star 10, the rectangle 12 and the circle 14 are loaded when the user clicks on the assigned-to text object 16. Thus, the loading of the star 10, the rectangle 12 and the circle 14 is under the control of the user.

Figure 3A:
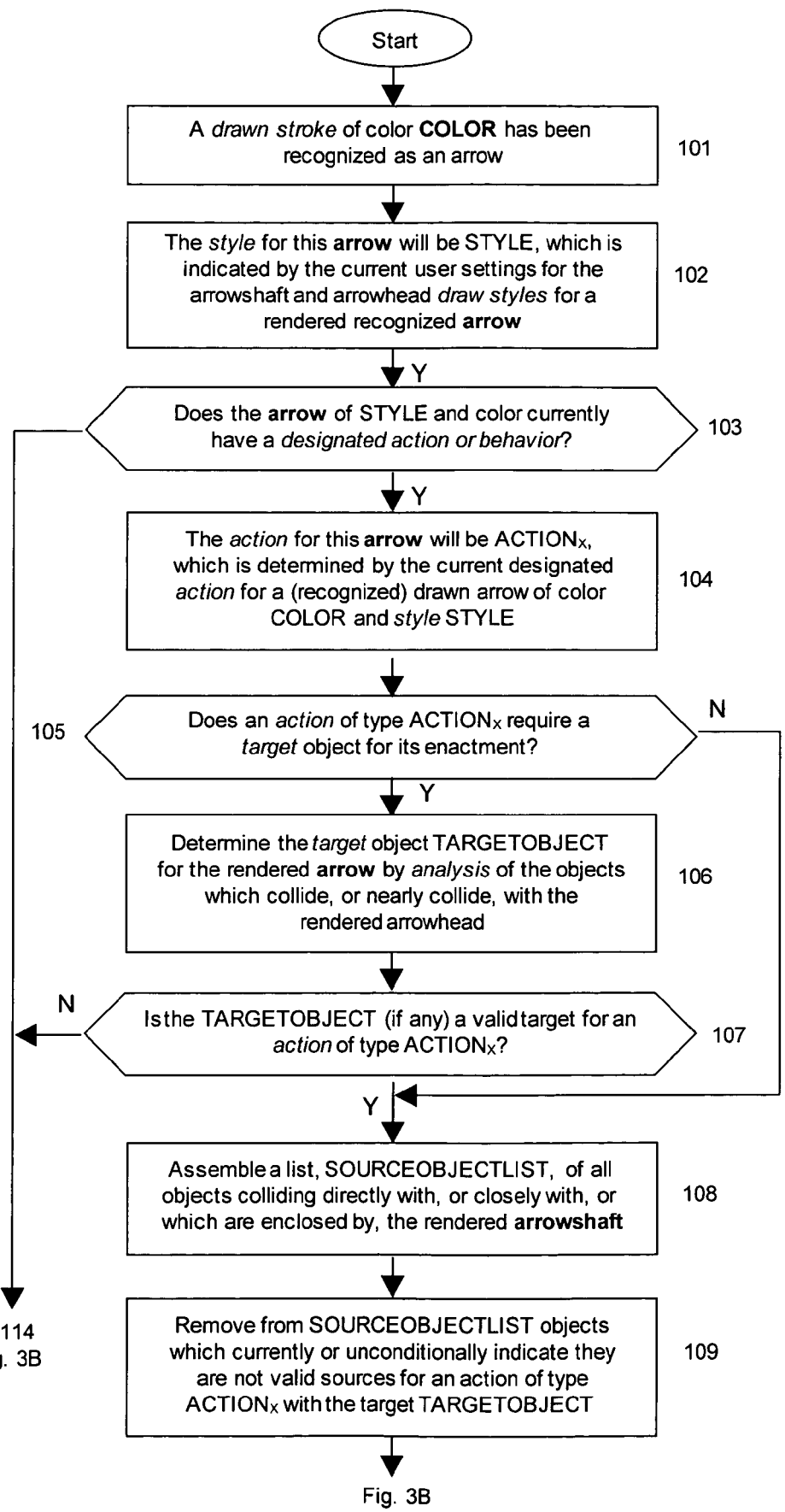

With reference to the flowchart of FIGS. 3A and 3B, the process for drawing arrows in Blackspace environment and applying an arrow logic in accordance with an embodiment of the invention is now described.

Block 101. A drawn stroke of color "COLOR" has been recognized as an arrow—a mouse down has occurred, a drawn stroke (one or more mouse movements) has occurred, and a mouse up has occurred. This stroke is of a user-chosen color. The color is one of the factors that determine the action ("arrow logic") of the arrow. In other words, a red arrow can have one type of action (behavior) and a yellow arrow can have another type of action (behavior) assigned to it.

Block 102. The style for this arrow will be "STYLE"— This is a user-defined parameter for the type of line used to draw the arrow. Types include: dashed, dotted, slotted, shaded, 3D, etc.

Block 103. Does an arrow of STYLE and COLOR currently have a designated action or behavior? This is a test to see if an arrow logic has been created for a given color and/or line style. The software searches for a match to the style and color of the drawn arrow to determine if a behavior can be found that has been designated for that color and/or line style. This designation can be a software default or a user-defined parameter.

If the answer to block 103 is yes, the process proceeds to block 104. If no, the process proceeds to block 114.

Block 104. The action for this arrow will be ACTION$_x$, which is determined by the current designated action for a recognized drawn arrow of COLOR and STYLE. If the arrow of STYLE and COLOR does currently have a designated action or behavior, namely, there is an action for this arrow, then the software looks up the available actions and determines that such an action exists (is provided for in the software) for this color and/or style of line when used to draw a recognized arrow. In this step the action of this arrow is determined. For a drawn and recognized yellow arrow, the action is defined as "place inside,"—the result of an "assignment" logic.

Block 105. Does an action of type ACTION$_x$ require a target object for its enactment? The arrow logic for any valid recognized arrow includes as part of the logic a determination of the type(s) and quantities of objects that the arrow logic can be applied to after the recognition of the drawn arrow. This determination of type(s) and quantities of objects is a context for the drawn arrow, which is recognized by the software.

EXAMPLE 1

Let's say a red arrow is drawn between four (4) faders such that the arrow intersects all four faders. Let's further say the red arrow logic is a "control logic," namely, the arrow permits the object that it's drawn from to control the object that it's drawn to. Therefore, with this arrow logic of the red arrow, a target is required. Furthermore, the first intersected fader will control the last intersected fader and the faders in between will be ignored. See block 111 and block 112 in this flow chart.

EXAMPLE 2

Let's say a yellow arrow is drawn between four faders, such that the arrow shaft intersects the first three faders and the tip of the arrow intersects the fourth fader. Let's further say that an "assignment" arrow logic is designated for the color yellow, namely, "every object that the arrow intersects will be assigned to the object that arrow points to." In this case, the arrow logic will be invalid, as a fader cannot be assigned to another fader according to this logic. Whereas, if the same yellow arrow is drawn to intersect four faders and the arrowhead is made to intersect a blue star, the four faders will be assigned to the star.

The behavior of the blue star will be governed by the yellow arrow logic. In this instance, the four faders will disappear from the screen and, from this point on, have their screen presence be determined by the status of the blue star. In other words, they will reappear in their same positions when the blue star is clicked on and then disappear again when the blue star is clicked once more and so on. Furthermore, the behavior of the faders will not be altered by their assignment to the blue star. They still exist on the Global drawing surface as they did before with their same properties and functionality, but they can be hidden by clicking on the blue star to which they have been assigned. Finally, they can be moved to any new location while they are visible and their assignment to the blue star remains intact.

EXAMPLE 3

Let's say you draw a green arrow which has a "copy" logic assigned to it, which states, "copy the object(s) that the arrow shaft intersects or encircled to the point on the Global Drawing surface (Blackspace) that the tip of the arrowhead points to". Because of the nature of this arrow logic, no target object is required. What will happen is that the object(s) intersected or encircled by the green arrow will be copied to another location on the Global Drawing surface.

If the answer to block 105 is yes, the process proceeds to block 106. If no, the process proceeds to block 108.

Block 106. Determine the target object TARGETOBJECT for the rendered arrow by analysis of the Blackspace objects which collide or nearly collide with the rendered arrowhead. The software looks at the position of the arrowhead on the global drawing surface and determines which objects, if any, collide with it. The determination of a collision can be set in the software to require an actual intersection or distance from the tip of the arrowhead to the edge of an object that is deemed to be a collision. Furthermore, if no directly colliding objects are found, preference may or not be given to objects which do not collide in close proximity, but which are near to the arrowhead, and are more closely aligned to the direction of the arrowhead than other surrounding objects. In other words, objects which are situated on the axis of the arrowhead may be chosen as targets even though they don't meet a strict "collision" requirement. In all cases, if there is potential conflict as to which object to designate as the target, the object with the highest object layer will be designated. The object with the highest layer is defined as the object that can overlap and overdraw other objects that it intersects.

In the case of a "place inside" arrow logic, the target object would be defined as the object that the "place inside" arrow is pointing to. This will become the object that references the assignment object (the "container").

Block 107. Is the target object (if any) a valid target for an action of the type $ACTION_x$? This step determines if the target object(s) can have the arrow logic (that belongs to the line which has been drawn as an arrow and recognized as such by the software) applied to it. Certain arrow logics require certain types of targets. As mentioned above, a "copy" logic (green arrow) does not require a target. A "control" logic (red arrow) recognizes only the object to which the tip of the arrow is intersecting or nearly intersecting as its target.

If the answer to block 107 is yes, the process proceeds to block 108. If no, the process proceeds to block 110.

Block 108. Assemble a list, SOURCEOBJECTLIST, of all Blackspace objects colliding directly with, or closely with, or which are enclosed by, the rendered arrowshaft. This list includes all objects as they exist on the global drawing surface that are intersected or encircled by or nearly intersected by the drawn and recognized arrow object. They are placed in a list in memory, called for example, the "source object list" for this recognized and rendered arrow.

Block 109. Remove from SOURCEOBJECTLIST, objects which currently or unconditionally indicate they are not valid sources for an action of type $ACTION_x$ with the target TARGETOBJECT. Different arrow logics have different conditions in which they recognize objects that they determine as being valid sources for their arrow logic. The software analyzes all source objects on this list and then evaluates each listed object according to the implementation of the arrow logic to these sources and to the target(s), if any. All source objects which are not valid sources for a given arrow logic, which has been drawn between that object and a target object, will be removed from this list.

Regarding a "place inside" arrow logic, objects that have "prevent assignment" turned on for them would be removed from the source list.

Block 110. Does SOURCEOBJECTLIST now contain any objects? If any source objects qualify as being valid for the type of arrow logic belonging to the drawn and recognized arrow that intersected or nearly intersected them, and such logic is valid for the type of target object(s) intersected by this arrow, then these source objects will remain in the sourceobjectlist.

If the answer to block 110 is yes, the process proceeds to block 111. If no, the process proceeds to block 114.

Block 111. Does the action "$ACTION_x$" allow multiple source objects? A test is done to query the type of arrow logic belonging to the drawn and recognized arrow to determine if the action of its arrow logic permits multiple source objects to be intersected or nearly intersected by its shaft.

If the answer to block 111 is yes, the process proceeds to block 113. If no, the process proceeds to block 112.

Regarding a "place inside" arrow logic, this logic permits multiple source objects. Thus, the "yes" branch of block 111 is taken for the "place inside" ("assignment") arrow logic.

Block 112. Remove from SOURCEOBJECTLIST all objects except the one closest to the rendered arrowshaft start position. In this case, the recognized arrow logic can have only a single source. So the software determines that the colliding object which is closest to the drawn and recognized arrow's start position is the source object and then removes all other source objects that collide with its shaft.

NOTE: Certain types of arrow logics require certain types of sources. For instance, if a red "control" arrow is drawn to intersect four switches and then drawn to point to blank Blackspace surface (an area on the global drawing surface where no objects exist), then no valid sources will exist and no arrow logic will be applied. The "red" logic will be considered invalid. It's invalid because although the source objects are correct for this type of arrow logic, a suitable target object must exist for the "control" logic to be valid in the absence of a context that would override this requirement. If however, this same red arrow is drawn to intersect these same four switches and then the tip of the arrow also intersects or nearly intersects a fifth switch (a valid target for this logic), then the red arrow logic recognizes the first intersected switch only as its source and the last intersected switch only as the target. The other intersected switches that appeared on the "sourceobjectlist" will be removed.

Block 113. Set the rendered arrow as Actionable with the action defined as $ACTION_x$. After block 112, the required action has been identified and has not been immediately implemented because it awaits an input from a user. As an example, identifying the action would be to have the arrowhead of the drawn and recognized arrow turn white (see block 115). An example of input from a user would be requiring them to click on the white arrowhead to activate the logic of the drawn and recognized arrow (see blocks 115-118).

Block 114. Redraw above all existing Blackspace objects an enhanced or "idealized" arrow of COLOR and STYLE in place of the original drawn stroke. If an arrow logic is not deemed to be valid for any reason, the drawn arrow is still recognized, but rendered onscreen as a graphic object only. The rendering of this arrow object includes the redrawing of it by the software in an idealized form as a computer generated arrow with a shaft and arrow head equaling the color and line style that were used to draw the arrow.

Block 115. Redraw above all existing Blackspace objects, an enhanced or "idealized" arrow of COLOR and STYLE with the arrowhead filled white in place of the original drawn stroke. After the arrow logic is deemed to be valid for both its source(s) and target object(s), then the arrowhead of the drawn and recognized arrow will turn white. This lets a user decide if they wish to complete the implementation of the arrow logic for the currently designated source object(s) and target object(s).

Block 116. The user has clicked on the white-filled arrowhead of an Actionable rendered arrow. The user places their mouse cursor over the white arrowhead of the drawn and recognized arrow and then performs a mouse downclick.

Block 117. Perform using $ACTION_x$ on the target object with source objects SOURCEOBJECTLIST. After receiving a mouse downclick on the white arrowhead, the software performs the action of the arrow logic on the source object(s) and the target object(s) as defined by the arrow logic.

Block 118. Remove the rendered arrow from the display. After the arrow logic is performed under block 117, the arrow is removed from being onscreen and no longer appears on the global drawing surface. This removal is not graphical only. The arrow is removed and no longer exists in time. However, the result of its action being performed on its source and target object(s) remains.

Figure 4:
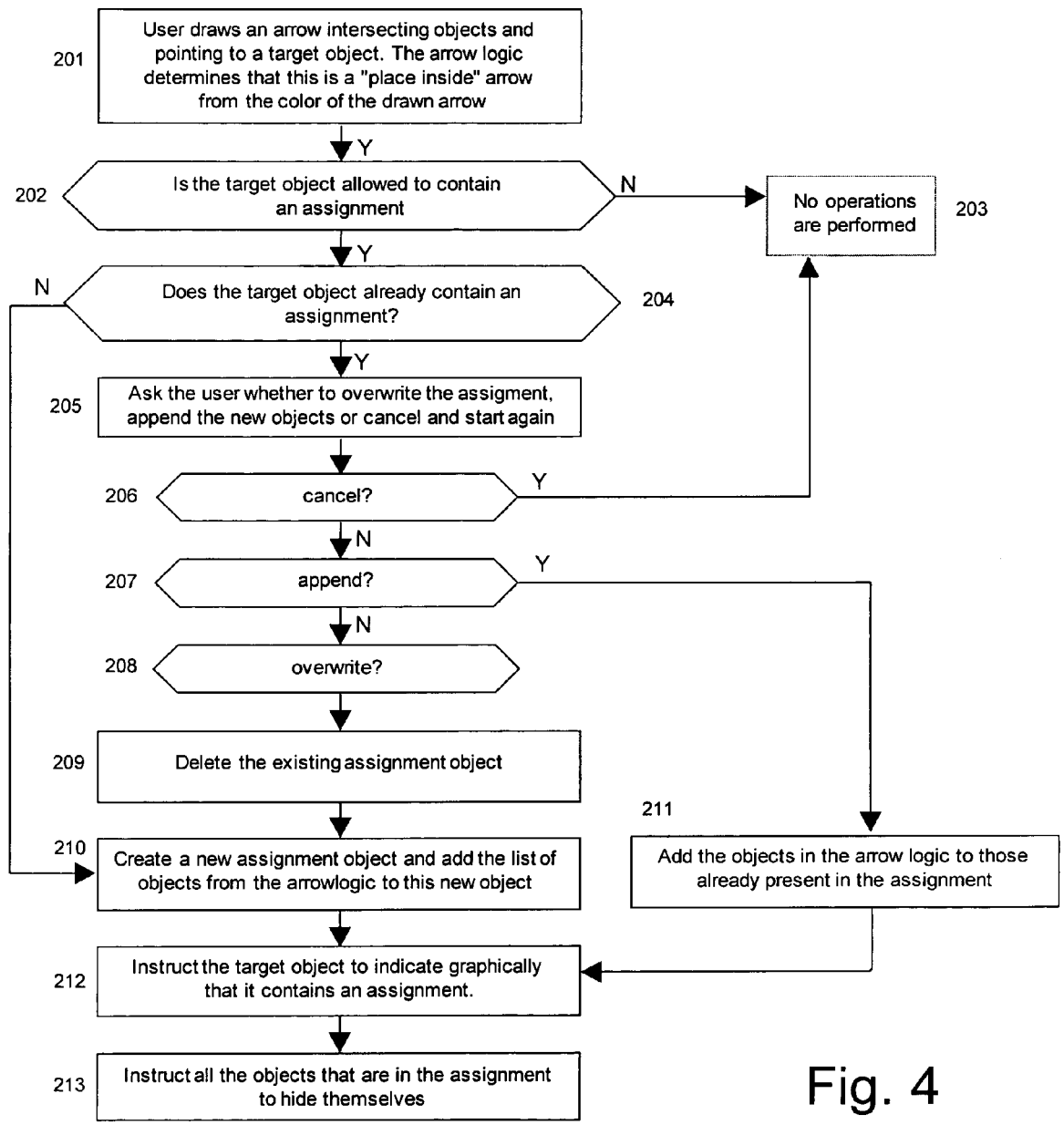
FIG. 4 is a flowchart of a process for making an assignment in accordance with an embodiment of the invention.

Turning now to the flowchart of FIG. 4, a process for making an assignment in accordance with an embodiment of the invention is described. This flowchart describes what happens after the arrowlogic software has determined that this is a "place-inside" operation. This procedure is part of the generic behavior of arrows and arrow logics.

Block 210. The user draws an object that is recognized as an arrow by the software. This drawn arrow intersects, encircles or nearly intersects one or more objects onscreen. Then the tip of the arrowhead of this arrow is pointed to an object. The arrow logic designated for this arrow is a "place inside" logic, which is used to make assignments. This logic assigns (places inside) all of its source objects into its target object.

The remaining blocks 202-213 of FIG. 4 are performed at block 117 of FIG. 3B.

Block 202. The software tests for the state of a flag that prevents an object from having an assignment. Certain objects have the state of this flag set on and other objects have the state of this flag set off. If this flag is set on for an object, that object cannot have an assignment made to it. Examples of objects that could have this flag set to on are Info Canvas objects and certain devices, like faders and knobs.

Block 203. If the flag is set "on," then the target object is not allowed to contain an assignment. Therefore, no operations are performed.

Block 204. If the flat is set to "off," then the target object is allowed to contain an assignment. Therefore, the software queries the target object again, asking "does it already contain an assignment." The point here is that it is possible to make an assignment to an object that already has an assignment.

Block 205. When a user clicks on the white arrowhead of a drawn and recognized arrow (with a "place inside" arrow logic designated for it), a pop up VDACC object or its equivalent appears onscreen. The word "VDACC" is a trademark of the NBOR Corporation. A VDACC object is a display object that manages other graphic objects on a global drawing surface, e.g., Blackspace. A VDACC object manages a section of workspace surface or canvas that may be larger than the visible or viewable area of the VDACC object. Thus, a VDACC object allows a user to scroll the visible area to view graphic objects or contents in the VDACC object that were hidden from the visible area. For more information on VDACC objects, see U.S. patent application Ser. No. 10/635, 742, filed on Aug. 5, 2003, entitled "Intuitive Graphic User Interface with Universal Tools", U.S. patent application Ser. No. 10/671,953, filed on Sep. 26, 2003, entitled "Intuitive Graphic User Interface with Universal Tools", and PCT patent application No. PCT/US2004/025547, filed on Aug. 5, 2004.

In this VDACC object are multiple choices for the user to select. Three possible choices are: (a) does the user wish to replace the objects that have been assigned to the already assigned-to target object?, (b) does the user wish to add new source objects to the assignment for this target object?, or (c) does the user wish to cancel the implementation of the "assignment" arrow logic?

Block 206. If the arrow logic is cancelled, then no operations are performed.

Block 207. If the arrow logic is updated (appended), then the source objects for the currently drawn arrow with its designated "place inside" arrow logic are added to the existing objects that were previously assigned to the target object for this drawn and recognized arrow.

Block 208. If overwrite is chosen, then the objects previously assigned to the target object for the drawn arrow with its designated "place inside" arrow logic are replaced with the source objects for this newly drawn and recognized arrow. In other words, if a user selects "overwrite" the objects that are intersected by the shaft of the drawn and recognized arrow will replace the objects that were already assigned to the target object of this newly drawn arrow.

Block 209. The objects previously assigned to the target object are deleted.

Block 210. An assignment object is the object that contains the contents of an assignment. The assignment object is a software construction. It's a container for the objects that have been assigned to a target object.

This construction permits a user to have one assignment that belongs to several target objects. This is possible because the assignment is an object in its own right. When a graphic object contains an assignment, all it knows about is the single thing called the assignment container. In other words, an object that contains an assignment contains a reference to the assignment object (the container). In this assigned-to object's own information structures it doesn't contain any knowledge about the object(s) that are contained within the assignment (within the "container").

This structure permits more than one graphic object to refer to the same assignment ("container"). Let's say a user assigns a number of objects to a red star. Then let's say the user draw 5 red stars onscreen. The software recognizes the drawing of each red star as both a recognized object and as an object referencing a "container," which contains one or more objects. But these objects are not necessarily known to the red star object. A user can draw as many red star objects as desired and each object will reference the same "container" and therefore reference the same list of assigned objects. Furthermore, when any of these red stars are activated (for instance, by left-clicking on them), the objects referenced in the "container" appear onscreen as part of the behavior of the assignment object. The assignment object is the "container."

A mechanism exists that permits a user to modify the assignment of just one of these red stars individually without changing the assignments of the other four. To accomplish this, the software permits a user to make a copy of an object that contains an assignment (one of these red stars), where the copy (star 6) of the red star contains a copy of that previous star's (star 5) assignment where the copied red star no longer refers to the original assignment (the contents of the original "container"). When an assigned-to object (this 5th red star) is copied, the graphic object is copied and the "container" that it references is also copied. Therefore this copied assigned-to red star (a sixth red star) has its own copy of the original "container" that is still being referenced by the other five red stars.

Let's say the user then modifies the objects that appear when the copied star (this sixth red star) is activated (e.g., by clicking on it). Let's say that there are 10 objects that appear. Let's further say that the user deletes one of these objects. The original container that is still being referenced by the other five red stars is unchanged. It still has 10 objects in it. However, the new copied container for the copied red star (this sixth red star) is changed so that it has 9 objects. So, this copied red star now references a modified container.

Now if this copied red star (6th red star) is itself copied, then the new copy (7th red star) will reference a copy of the container referenced by the 6th red star and so on.

The assignment container has functionality in software to show its contents and hide its contents and preserve the integrity of its contents, e.g., the location, functions, actions, properties and the like of each of the objects assigned to it. Also it has functionality to save itself to disk file. The point here is that the assignment object (the container) is a software object that provides the functionality for assignments and can be attached to graphic objects as the result of user actions.

The other feature here is that assignments can be determined as a reference assignment for a particular shape and color. In this case, when you draw an object of that shape and color, an assignment or a copy of that assignment is attached to that object.

Block 211. Regarding a yes response to an append choice, the software adds newly intersected, encircled or nearly intersected source objects to the objects that already exist in the "container" that is being referenced by the target object of this newly drawn and recognized arrow.

Block 212. When an assignment is successfully completed for a target object, the appearance of that object is changed so the user can quickly distinguish that object from other graphic objects that do not have assignments to them. One possible graphical change would be to have a wireframe object, like a star or circle that appears as a line drawing, become filled in with a color.

Block 213. One possible result of completing an assignment to a target object is to automatically have the software hide all of the source objects for that assignment so they are no longer visible onscreen. In addition, as part of the process of "hiding" these objects, they can be hidden in such a way as they cannot be bumped into, disturbed, harmed or in any way altered by drawing other objects onscreen where the now hidden objects exist.

Figure 5:
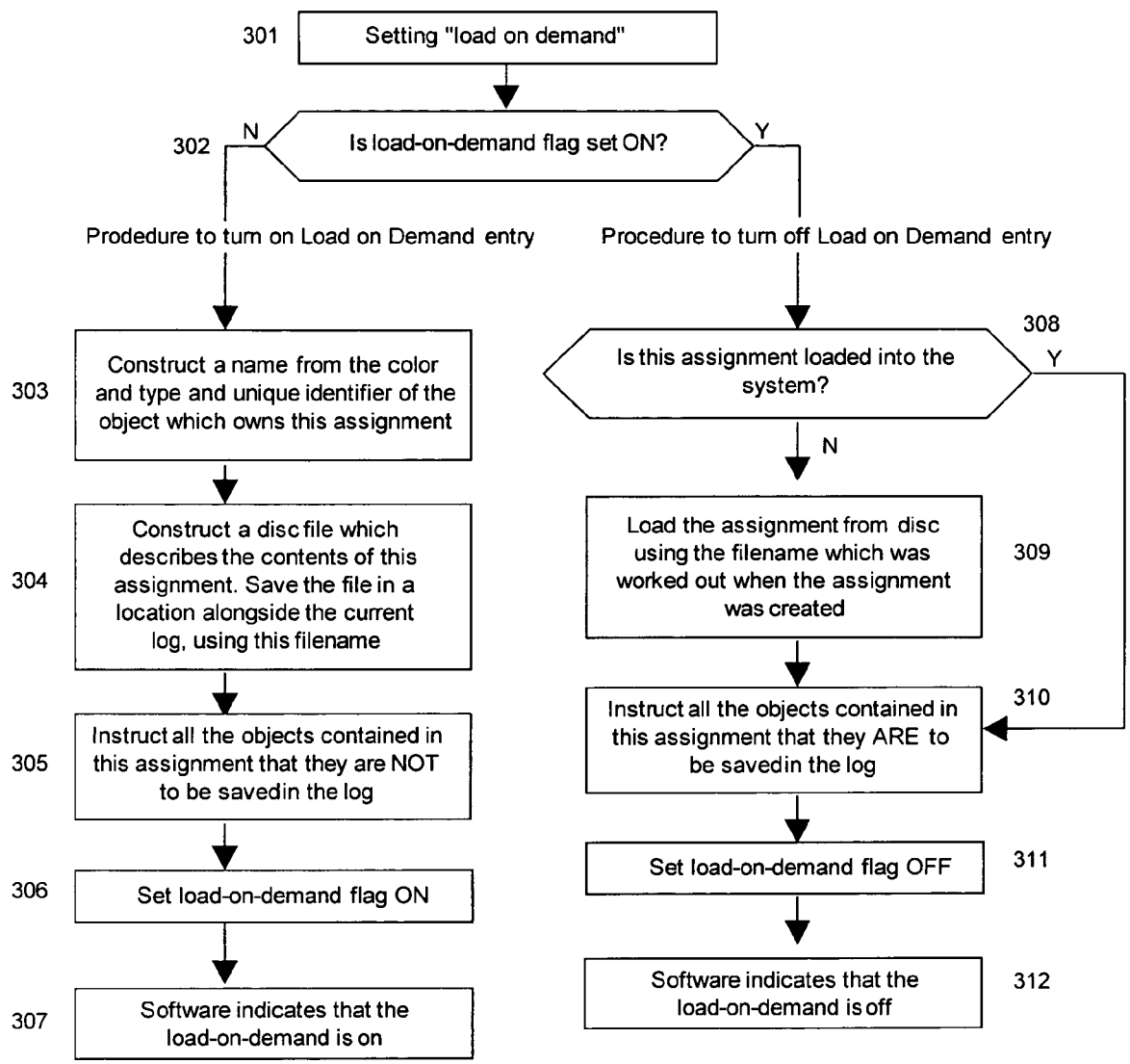
FIG. 5 is a flowchart of a process for turning a load-on-demand function "on" or "off" for an assignment object in accordance with an embodiment of the invention is described.

With reference to the flowchart of FIG. 5, the process for turning a load-on-demand function "on" or "off" for an assignment object in accordance with an embodiment of the invention is described. Assignments can be given the property of Load on Demand. In this case when a log containing such an assignment is loaded into the system, the assignment itself is not loaded until it is required by the user. This has the effect of allowing the user to be able to load apparently large documents in a very short time. This flowchart describes what happens when Load-on-Demand is turned on and off for an assignment Block 301. The user right-clicks on the Info Canvas object for an assigned-to object, like a red star. In this object's Info Canvas object a user then selects the entry "Object Assignments." This brings up an Info Canvas object that is the Info Canvas object for the assignment object (the "container"). In this Info Canvas object is an entry entitled: "Load on Demand." The user clicks on this entry and it changes state. If it is on, it turns off. If it's off, it turns on. In this case, the user turns this entry on. Typically, the appearance of this entry will change in some fashion to indicate a change of state. For instance, the entry's text "Load on Demand" could turn green to indicate that it has been activated.

Block 302. The container has a flag that determines whether this function "Load on Demand" is on or off. The software checks to see the status of this flag. Going down the left side of this flow chart, the user turns on the Load on Demand entry in the Info Canvas object for the "Container."

Block 303. The flag is set to off. The software creates a filename that refers uniquely to this assignment. It takes three properties of the owner graphic object: (a) the color of the object, (b) the type of the object, e.g., a circle, square, star, etc., and (3) a unique identifier for the object.

The owner graphic object is the graphic object that refers to this particular "container" object. For example, the following properties would apply to the red star. The color of the object is red, as opposed to green or gray. The type of the object is "a star," as opposed to a square, check mark, or circle. The unique identifier for the object is a number which distinguishes this object from all other objects in the software. This is a very large string of decimal numbers that minimizes the possibility of a duplicate number. The software takes these three properties and together they comprise a name in the software for a file.

Block 304. The software constructs a file on disk which has the name created in Block 303. This file contains all of the information necessary to reconstruct the assignment object ("the container") and all of its contents. This file is then saved in a location on disk. This location can change according to software requirements. One possible location would be in the same folder that contains the document ("log") that contains the owner object that is referencing the "container" described above.

Block 305. The software instructs all of the objects that belong to the "container" that they are not to be saved in a "log." This means that these objects will not be loaded when the "log" is loaded. This enables the log to be loaded more quickly as the contents of various "containers" do not have to be loaded along with it before it can finish loading and the user can begin working with it.

Block 306. The software sets the Load on Demand flag to "ON" in the "container." This determines that the action(s) described under Block 305 will take place. If the Load on Demand flag is set on, the entry in the "container" Info Canvas object is green (on).

Block 307. The software changes the appearance of the load on demand entry to indicate that it is on. A typical way of performing this task would be to turn the color of the entry text from gray to green.

Block 308. Going down the right side of this flow chart, the user turns off the Load on Demand entry and the software asks "is this assignment loaded into the system?" In other words, has the user operated this assignment to cause it to be loaded. One way to cause this loading would be to left-click on an assigned-to object, like the red star, which will result in having the objects in the container that this object references appear onscreen or the equivalent of this action.

Block 309. In order for the software to load an assignment, it needs to get a filename for that assignment. This filename can be saved on any device, like a hard drive or CD or the like. The software loads the assignment using the filename which was preserved from blocks 303 and 304, i.e., when the file was saved to a media, like a hard drive. The filename that was used when the assignment was saved is recalled here. The filename was saved as part of the assignment object when the assignment was saved.

When Load on Demand is on then the only thing that the assignment object contains (the container) is the name of the file which has the information about this assignment and the flag which says that load on demand is set on. There is no other information in this assignment object. This is because the objects for the container are saved to media, and are recalled from disk only when the user activates (clicks on) an assigned-to object.

Block 310. The software instructs all the objects that are contained in this assignment that they ARE to be saved in a log. Since the Load-on-Demand feature is being turned off, contained objects are no longer loaded after the log is loaded. Instead they are loaded when the log is loaded.

Block 311. The software now turns off the Load-on-Demand flag.

Block 312. The software indicates that the load-on-demand is off. One way to do this is to turn the entry "Load-on-demand" gray.

At this point in time, when the log is loaded, all of the objects that belong to the container that is referenced by the assigned-to object are loaded as part of the log. In this case, the user cannot utilize the environment of the log until all of the objects are loaded.

Furthermore, this flow chart accounts for one such container and the assigned-to object which references it. Consider a log that has a 100 such containers. If all such containers were not in Load-on-Demand, then the load time for this log could be considerable, as it could take time for the computer processor to build all of the necessary graphic objects and associated links and the like for each of the 100 containers. However, if Load-on-Demand were turned on for each of the 100 containers, then the load time for this log would be significantly faster, even approaching the same load speed as if none of these assignments existed in the log.

This is because Load-on-Demand would permit this log to be loaded without having to load any of the objects that belong to any container. Then as a user wished to activate any assignment to gain access to its container's objects, they could do so in their own time. Then at that time, the container's objects for that assignment only would load.

Block 312. The software changes the appearance of the Load on Demand entry to indicate that it is off. A typical indication would be to turn the color of the entry text from green to gray.

Figure 6:
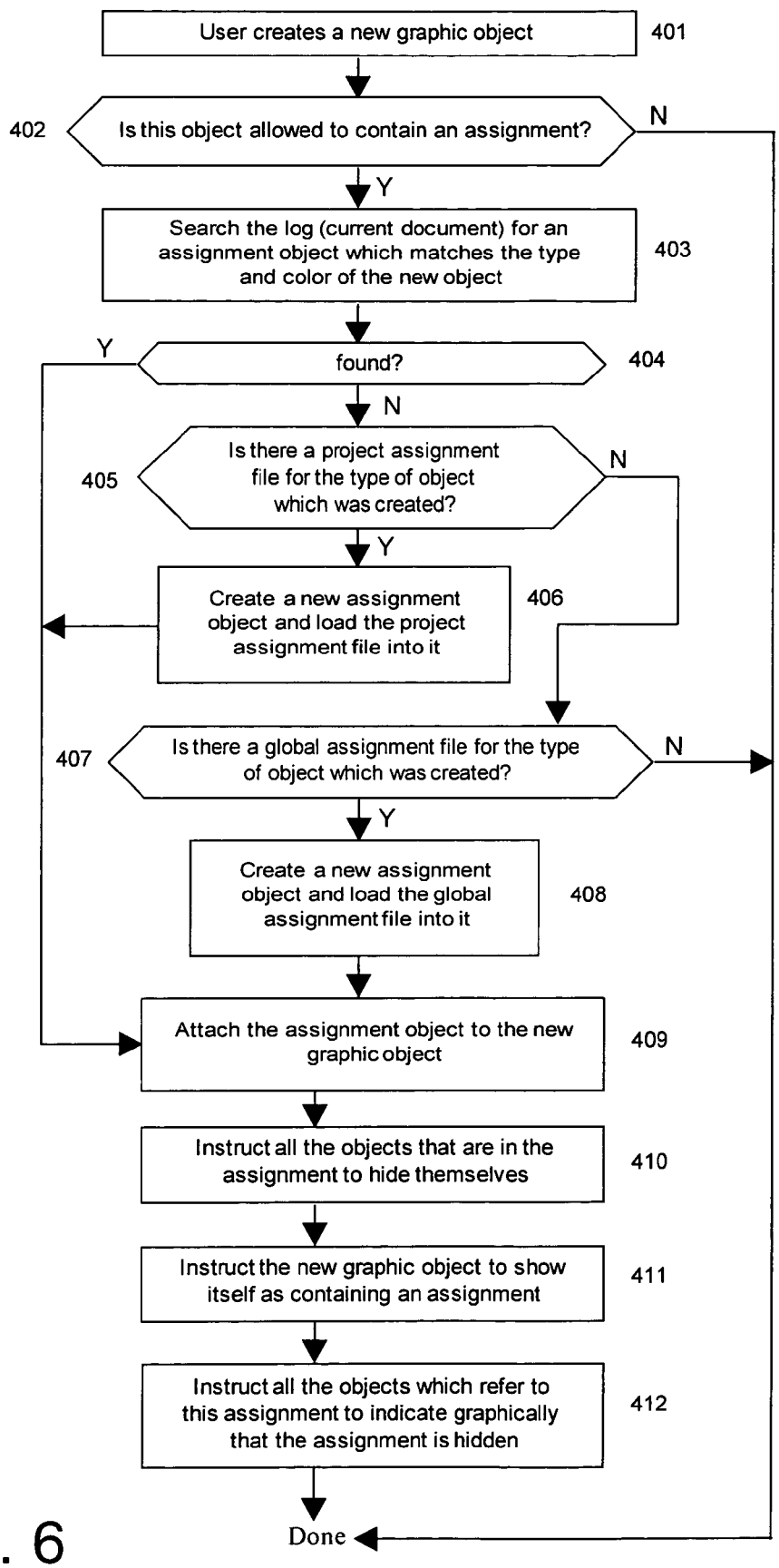
FIG. 6 is a flowchart of a process for recalling an automatic assignment when a user creates a new graphic object in accordance with an embodiment of the invention.

With reference to the flowchart of FIG. 6, the process for recalling an automatic assignment when a user creates a new graphic object in accordance with an embodiment of the invention is described. When the user creates a new graphic object, the system looks to see if an assignment has been previously allocated to this type of object. If it has then the existing assignment is automatically attached to the new object.

Block 401. A user draws or otherwise creates a graphic object, like star, switch, folder, or the like.

Block 402. The software tests to see if the newly drawn object is a type that can support objects being assigned to it.

Block 403. Each document has a list of assignments which are already present in the document. These are stored according to the type and color of the object which owns them, e.g., a red star. This is so that when a new red star is created, any previous such assignment object can be quickly found.

The software searches the current "log" (the current open file) for an assignment that matches the type and color of the newly drawn object. Let's say a user draws a blue circle onscreen. The software searches to see if there exists an assignment to a blue circle.

Block 404. Is such an assignment object found?

Block 409. If yes, then the found assignment object or "container" under block 404 is attached to the newly drawn graphic object. In other words, the newly drawn graphic object refers to this "assignment object" as its assignment. To further define this operation, the assignment object itself adds the newly drawn graphic object to its list of "parent objects." A parent object is an object which when activated will display the contents of the "assignment object" that it refers to.

Block 410. Then all of the objects that are contained within this assignment object will be hidden onscreen. To the user, these objects appear to fly into the newly drawn graphic object and thereby disappear from onscreen. Many different types of graphical visualizations of this action are possible other than that of "flying into" the newly drawn object.

Block 411. The appearance of the newly drawn object, which has had an assignment made to it, is changed so the user can tell that it has an assignment. This change in appearance enables a user to tell which graphic objects onscreen have assignments to them and which do not. A common visual change to a graphic object is to fill it in with a solid color that equals its perimeter color. In other words, let's say a user draws a blue circle onscreen. Let's say it exists as a wire frame object—it appears onscreen as a blue outline of a circle. This blue outline will become filled in with the same color blue as the outline, so it then appears as a solid two dimensional object. Other possibilities include, changing it to a three dimensional object to indicate that it has an assignment or changing its size or adding a outline color around it and so on.

Block 412. This is an optional step. This step is not required for the successful operation of an automatic assignment. An object which contains an assignment can indicate that the objects contained in the "container" that it refers to are visible or not visible onscreen. This is an additional visual indication beyond what is provided for under block 411. This visual indication shows whether the objects which belong to the container, for which the clicked-on object refers to, are visible onscreen or are not visible. One might argue that this is purely axiomatic. However, many assigned-to objects can be visible onscreen at one time. The visual indication of block 412 is valuable because it tells the user which assigned-to object has caused the currently visible contents of a "container" to become visible onscreen.

There are many possibilities here. Let's take the example of a switch that has an assignment to it. In this case, block 412's visualization would be whether the switch is green (on) or gray (off) or whether it is depressed into the screen (on) or not depressed into the screen (off). Another possibility would be adding an additional outline color around the current outline of an assigned-to object. Let's say there exists a blue circle that has a blue outline and a blue fill color, indicating that it has an assignment to it, thus this is an "assigned-to" graphic object. Under block 412, an additional colored outline that is not blue, can be added around the blue circle to indicate the status of the assigned-to object as described under block 412.

Block 405. If the answer to block 404 is "no," then the software searches to see if there is a project assignment file that matches the newly drawn object. There are three levels of assignments: (a) local, (b) project and (c) global.

A local assignment is an assignment object which is contained in a log. It exists as a software object which is not in a file of its own. A local assignment is an assignment which is not saved externally. It only exists within a log. It's not transferable to other logs. The exception to this is if a local assignment is designated to be "Load-on-Demand." In this case, it is saved as a file.

A project assignment file is a file containing a description of a collection of objects which make up an assignment. This file is identified as appropriate for this type of object because it has a filename which contains the shape and color of the object which it should be loaded for, for example a red star. The file is identified as a project file because it is located in a sub-folder of the folder which contains the current log (document).

A global assignment file is a file containing a description of a collection of objects which make up an assignment. This file is identified as appropriate for this type of object because it has a filename which contains the shape and color of the object which it should be loaded for, for example a red star. The file is identified as a global assignment file because it is located in a predetermined system folder where it can be found from any log (document).

Block 406. If there is a project assignment for the newly drawn object, then the software creates an empty assignment object. Then it loads the project assignment file into this new assignment object.

Then in block 409 the newly drawn object is told to refer to this assignment object. See block 409 above.

Note: all objects that are part of an assignment remain unchanged in every way unless a user chooses to change them. Therefore, the location, status, properties, behaviors, if any, and associated functions, if any, of all objects that belong to a "container" ("assignment object") are perfectly preserved when these objects are recalled. However, since the nature of assignments is that the graphic objects that are contained within a container are hidden or not hidden onscreen, a user can change anything in the aforementioned list of object attributes regarding any of these contained objects and they remain as the user alters them. If the user saves these alterations for the contained objects in a log, then they become part of that log. Therefore, when the log is recalled and the assigned-to graphic object is drawn onscreen (or it may already exist onscreen), and then it is activated (e.g., by clicking on it), the container object that this assigned-to graphic object refers to will appear with the same altered attributes that existed when the log was saved.

In addition, if a user chooses to save this assignment as a project or global assignment (for details see the discussion below regarding the flowchart of FIG. 8), then a full description of the assignment is saved in a file, including the descriptions of all the objects that it contains. Then when a user draws an appropriate graphic object, which correctly refers to any project or global file, that file is loaded into a new assignment object which reproduces the originally saved assignment. Thus the user gains access to the objects contained in that assignment's container. To do so, the user activates the "assigned-to" object which refers to the newly created container.

Block 407. Referring from block 405, the software checks to see if there is a global assignment file that matches the newly drawn object.

Block 408. If yes, then the software creates an empty assignment object. Then it loads the global assignment file into this new assignment object.

If no, then the process ends and no assignment is loaded because no assignment was found.

Figure 7:
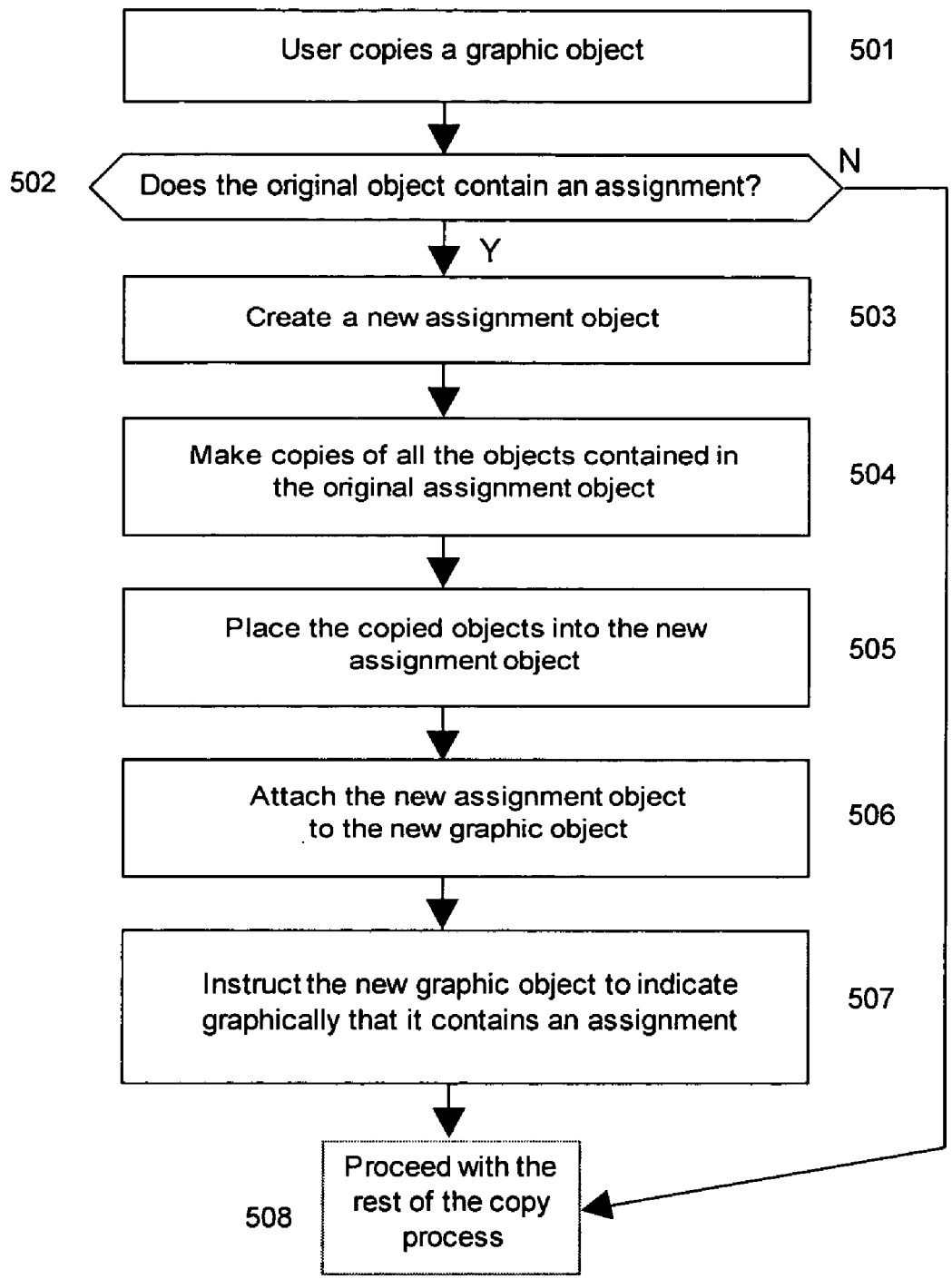
FIG. 7 is a flowchart of a process for recalling an automatic assignment when a user copies an assignment object in accordance with an embodiment of the invention is described.

With reference to the flowchart of FIG. 7, the process for recalling an automatic assignment when a user copies an assignment object in accordance with an embodiment of the invention is described.

Block 501. A user copies a graphic object. There are various methods of doing this. For instance, a user could click and hold for one second on any graphic object and then drag off a copy. Alternately, a user could select a copy function in a menu for the object to create a copy.

Block 502. When the user makes a copy of an existing graphic object, the code checks to see if the existing object contains an assignment.

Block 503. If the original object does not contain an assignment, then the software continues with the normal copy process without copying an assignment.

Block 504. If the original object does contain an assignment, then the software creates a new empty assignment object (a new empty "container").

Block 505. All of the objects in the original assignment are copied and the copies are all placed into the new assignment object. This new assignment object contains copies all of the objects contained in the original assignment object including copies all of the attributes of these objects, e.g., their properties, behaviors, and the like.

Block 506. At this point there is a copy of the original graphic object and a copy of the original graphic object's assignment. The software then places the copy of the original object's assignment into the copy of the original graphic object. See the discussion of block 409 for the flowchart of FIG. 6.

Block 507. The copy has its appearance changed to match that of the original "assigned-to" object, from which the copy was made. As previously mentioned, objects could indicate that they contain an attached assignment by changing their border color to another color, or becoming filled with a color or by showing an additional outline shape. See the discussion of blocks 410, 411 and 412 of the flowchart of FIG. 6.

Block 508. Once the assignment is properly copied, the software proceeds with the rest of the copy process. The process of copying an assignment is just part of the process of copying a graphic object. For instance, there may be notes associated with the original graphic object and/or any other properties, behaviors, associated functions, actions and anything else that is part of the definition of that object that needs to be copied.

Figure 8:
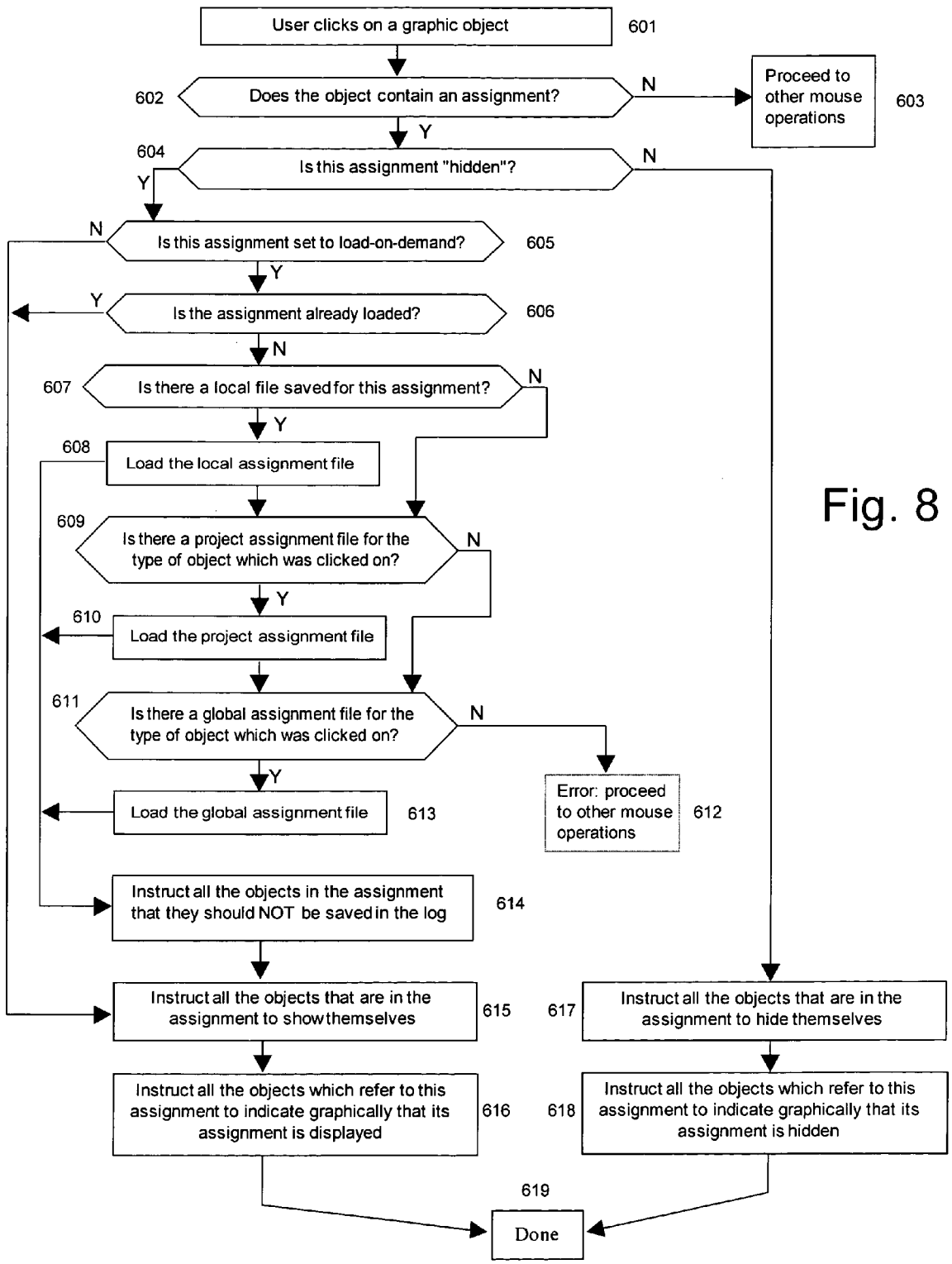
FIG. 8 is a flowchart of a process for operating an assignment in accordance with an embodiment.

With reference to the flowchart of FIG. 8, the process for operating an assignment in accordance with an embodiment of the invention is described.

Block 601. The user clicks on a graphic object. This process simply involves a user selecting a graphic object. This can more commonly be done by left-clicking on the object but many other methods are possible, such as verbal commands, lassoing the object, etc.

Block 602. The software checks to see if the graphic object contains an assignment.

Block 603. If no, then the software proceeds to other mouse operations.

Block 604. If yes, then the software checks to see if the assignment is hidden. In other words, are the objects that are contained in the assignment "container" visible onscreen?

Block 617. If no, then the software instructs these objects, that are contained in the assignment object, to be hidden—disappear from view onscreen.

Block 618. Then all objects that refer to this assignment are instructed to change their appearance to indicate that the objects contained in the assignment object are hidden. Objects could indicate the state of their attached assignments by changing their border color or (in the case of switches) by showing themselves being turned ON or OFF as appropriate.

Note: It is possible to have multiple objects of the same type refer to the same "container." For instance, let's say a blue circle refers to a "container" that has various objects assigned to it. A user could easily draw any number or blue circles onscreen. Each of these blue circles would refer to the same container and the objects that are assigned to it.

Block 605. The software checks to see if this assignment has been set to "Load-on-Demand." This can be a software default, but more commonly it is a user-defined status. To set this status on or off, the user can right-click on the assigned-to object and its Info Canvas object either turn "Load-on-Demand" on or off.

Block 606. The software checks to see if the assignment is already loaded.

Block 615. If yes, then the software instructs all of the contained objects that are in the assignment object to become visible onscreen.

The software instructs all objects which refer to the assignment to indicate graphically that the assignment is displayed. Objects that have assignments to them become visually changed so a user can tell which objects have assignments to them and which objects don't. Visual changes can be varied. One such change would be to change a graphic object from a wire frame to a filled object. Another such change would be to add an outline of a different color around an object with an assignment.

Block 607. NOTE: If the assignment object is set to Load-on-Demand and the assignment has not already been loaded, then all that the assignment object contains is the name of a file which has a description of the contained objects for this assignment object. At this point the assignment object includes no contained objects.

Referring from step 6, if no, then the software checks to see if there is a local assignment file saved for this assignment. NOTE: Local assignments are generally saved directly in a log, whereas project and global assignments are saved in separate files on a media connected to a computer.

Block 609. Referring from block 607, if no, then the software checks to see if there is a project assignment for this type of graphic object.

Block 611. If no, then the software checks to see if there is global assignment for this type of graphic object.

Block 612. If the software arrives at this step, this means that the assignment was set to Load-on-Demand, but the software can find no file to load. So the process is abandoned.

Block 608. Referring to block 607, if yes, then the software loads the local assignment file. During the loading process the file is read and objects are constructed from descriptions in this file. These objects are placed into the assignment object.

Summary: The file is used to construct all of the objects that belong to this assignment. The name of the file for a local assignment, which is set to Load-on-Demand, is one of the properties of the assignment object itself. This file name is used to load the description of the required contained object (s) into the assignment object.

Block 614. Then the software instructs all of the objects in the assignment that they are not to be saved in the log. They are instead saved in a project file on a media connected to the computer.

Block 610. Referring to block 9, if yes then the software loads the project assignment file.

This then proceeds to blocks 614, 615 and 616 where the process finishes at block 619.

Figure 9:
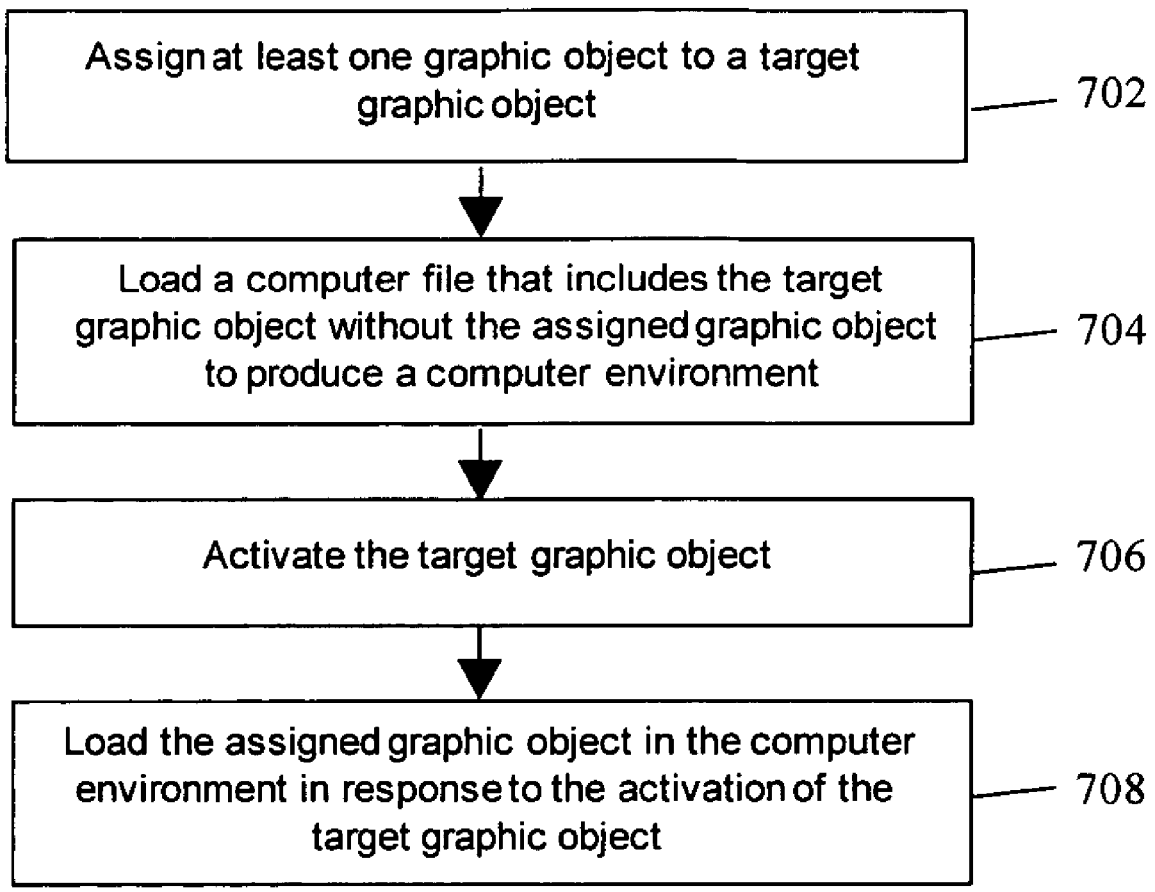
FIG. 9 is a process flow diagram of a method for performing a load-on-demand operation in accordance with an embodiment of the invention.

A method for performing a load-on-demand operation in accordance with an embodiment of the invention is described with reference to a flow diagram of FIG. 9. At block 702, at least one graphic object is assigned to a target graphic object. Next, at block 704, a computer file that includes the target graphic object is loaded without the target object's assigned graphic object(s), to produce a computer environment having the target graphic object. Next, at block 706, the target graphic object is activated, e.g., in response to a user clicking on the target graphic object. Next, at block 708, the assigned graphic object(s) are loaded in the computer environment in response to the activation of the target graphic object.

An embodiment of the invention includes a storage medium, readable by a computer, tangibly embodying a program of instructions executable by the computer to perform method steps for performing a load-on-demand operation.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing a load-on-demand operation, said method comprising:

displaying first and second graphic objects on a surface of a computer operating environment;

assigning said first graphic object to said second object such that said first graphic object is placed in said second graphic object;

activating a load-on-demand setting for said second graphic object, said activating being independent of any other load-on-demand settings for other assigned-to graphic objects in said computer operating environment;

loading a computer file that includes said other assigned-to graphic objects and said second graphic object without said first graphic object to produce a computer environment having said other assigned-to graphic objects and said second graphic object;

activating said second graphic object in said computer environment; and loading said first graphic object in said computer environment in response to said activating of said second graphic object without loading any graphic objects for said other assigned-to graphic objects, wherein said assigning said first graphic object includes drawing a graphic directional indicator to said second graphic object in an original computer environment, including associating said first graphic object with said graphic directional indicator to assign said first graphic object to said second graphic object.

2. The method of claim 1 wherein said drawing said graphic directional indicator includes drawing an arrow in said original computer environment in response to a user-drawn line.

3. The method of claim 2 wherein said drawing said arrow includes drawing said arrow of a particular color in said original computer environment in response to said user-drawn line of said particular color.

4. The method of claim 1 further comprising saving said first graphic object to a secondary computer file that is separate from said computer file so that said computer file can be independently loaded without said secondary computer file.

5. The method of claim 4 wherein said loading said first graphic object includes loading said secondary computer file into said computer environment.

6. The method of claim 1 wherein said assigning includes graphically indicating said second graphic object is an assigned-to object.

7. A storage medium readable by a computer, tangibly embodying a program of instructions executable by said computer to perform method steps for performing a load-on-demand operation, said method steps comprising:

displaying first and second graphic objects on a surface of a computer operating environment;

assigning said first graphic object to said second object such that said first graphic object is placed in said second graphic object;

activating a load-on-demand setting for said second graphic object, said activating being independent of any other load-on-demand settings for other assigned-to graphic objects in said computer operating environment;

loading a computer file that includes said other assigned-to graphic objects and said second graphic object without said first graphic object to produce a computer environment having said other assigned-to graphic objects and said second graphic object;

activating said second graphic object in said computer environment; and loading said first graphic object in said computer environment in response to said activating of said second graphic object without loading any graphic objects for said other assigned-to graphic objects, wherein said assigning said first graphic object includes drawing a graphic directional indicator to said second graphic object in an original computer environment, including associating said first graphic object with said graphic directional indicator to assign said first graphic object to said second graphic object.

8. The storage medium of claim 7 wherein said drawing said graphic directional indicator includes drawing an arrow in said original computer environment in response to a user-drawn line.

9. The storage medium of claim 8 wherein said drawing said arrow includes drawing said arrow of a particular color in said original computer environment in response to said user-drawn line of said particular color.

10. The storage medium of claim 7 further comprising saving said first graphic object to a secondary computer file that is separate from said computer file so that said computer file can be independently loaded without said secondary computer file.

11. The storage medium of claim 10 wherein said loading said first graphic object includes loading said secondary computer file into said computer environment.

12. The storage medium of claim 7 wherein said assigning includes graphically indicating said second graphic object is an assigned-to object.

* * * * *